(12) United States Patent
Omotowa

(10) Patent No.: US 8,231,855 B2
(45) Date of Patent: Jul. 31, 2012

(54) METHOD FOR PRODUCTION OF SULFUR HEXAFLUORIDE FROM SULFUR TETRAFLUORIDE

(76) Inventor: Bamidele A. Omotowa, Idaho Falls, ID (US)

( * ) Notice: Subject to any disclaimer, the term of this patent is extended or adjusted under 35 U.S.C. 154(b) by 1 day.

(21) Appl. No.: 12/980,111

(22) Filed: Dec. 28, 2010

(65) Prior Publication Data

US 2012/0164060 A1 Jun. 28, 2012

(51) Int. Cl.
*C01B 17/45* (2006.01)
(52) U.S. Cl. .................. 423/469; 423/467; 423/489
(58) Field of Classification Search .............. 423/467, 423/469, 489
See application file for complete search history.

(56) References Cited

U.S. PATENT DOCUMENTS

| | | | |
|---|---|---|---|
| 2,555,739 A | 6/1951 | Gall | |
| 2,883,267 A | 4/1959 | Muetterties et al. | |
| 2,897,055 A | 7/1959 | Muetterties et al. | |
| 2,904,476 A | 9/1959 | Man | |
| 2,937,123 A | 5/1960 | Muetterties et al. | |
| 2,717,235 A | 9/1965 | Prober | |
| 3,361,532 A | 1/1968 | Massonne | |
| 3,976,757 A * | 8/1976 | Wilkalis et al. | 423/466 |
| 4,039,646 A | 8/1977 | Massonne | |
| 4,082,839 A * | 4/1978 | Eibeck et al. | 423/489 |
| 4,186,180 A | 1/1980 | Di Gioacchino | |
| 4,380,532 A | 4/1983 | Mazurin | |
| 5,639,435 A | 6/1997 | Miller | |
| 5,744,022 A | 4/1998 | Miller | |
| 2010/0260659 A1* | 10/2010 | Winter | 423/469 |

* cited by examiner

*Primary Examiner* — Ngoc-Yen Nguyen
(74) *Attorney, Agent, or Firm* — Robert L. Shaver; Dykas & Shaver, LLP

(57) ABSTRACT

Disclosed is a method for an energy-efficient improvement in the production of sulfur hexafluoride, and eliminates the generation of other byproducts. The process is an oxidative fluorination of sulfur tetrafluoride by $CoF_3/F_2$, where $CoF_3$ is solid stationary phase that can be regenerated.

16 Claims, 3 Drawing Sheets

METHOD FOR PRODUCTION OF SULFUR HEXAFLUORIDE FROM SULFUR TETRAFLUORIDE

TECHNICAL FIELD

The present invention generally relates to methods for production of sulfur hexafluoride by reacting sulfur tetrafluoride with fluorine with cobalt trifluoride as catalyst/fluorinating agent. The sulfur tetrafluoride is prepared by two step reactions from uranium tetrafluoride, or uranium hexafluoride in a process that was described in a previous U.S. patent.

BACKGROUND

Sulfur hexafluoride ($SF_6$) is a hypervalent, inorganic, colorless, odorless, non-toxic and non-flammable gas compound that is poorly soluble in water. It has a density of 6.1 g/L. Some 75% of the 8,000 tons of $SF_6$ produced per year is used as a gaseous dielectric medium in the electrical industry; as an inert gas for the casting of magnesium; and as an inert filling for insulated glazing windows. $SF_6$ plasma is also used in the semiconductor industry as an etchant. Because $SF_6$ is relatively slowly absorbed by the bloodstream, it is used to provide a long-term plug of a retinal hole in retinal detachment repair operations. $SF_6$ is employed as a contrast agent for ultrasound imaging of peripheral vein to enhance the visibility of blood vessels to ultrasound. This application has been utilized to examine the vascularity of tumors. Sulfur hexafluoride is also used as a fluorophilic gaseous diluent for ammonia in the efficient reaction with fluorine to produce nitrogen trifluoride.

New fluoride recovery methods for management of uranium fluorides in the nuclear industry could produce large quantities of uranium-free sulfur tetrafluoride. An efficient process for production of sulfur hexafluoride from sulfur tetrafluoride is required to further increase the commercial value of this approach to nuclear waste management. There is incentive to develop lower cost of producing sulfur hexafluoride.

Meanwhile, currently patented processes involve either direct fluorination of sulfur in an electrolytic reactor with byproducts including $SF_4$, and $S_2F_{10}$; or use of oxygen to oxidize sulfur in sulfur tetrafluoride with production of sulfur dioxide as byproduct. Also, the reaction of xenon tetrafluoride with sulfur tetrafluoride to produce sulfur hexafluoride has been reported in the literature. However, this process is cost prohibitive as an industrial process. Evaluation of the feasibility of efficient alternative process for production of sulfur hexafluoride from sulfur tetrafluoride has involved a review of the thermodynamic data, such as the enthalpy ($\Delta H$), Gibbs free energy ($\Delta G$), and equilibrium constant (log K) of the theoretical process by using the HSC Chemistry 7.0 software. The comparative data, ($\Delta H$) and log k, for oxidation of S(IV) to S(VI) by oxygen ($O_2$), fluorine ($F_2$), xenon tetrafluoride ($XeF_4$), and cobalt trifluoride ($CoF_3$) are shown in Tables 1 and 2.

The results suggest that cobalt trifluoride, a strong fluorinating agent, could produce a basis for new reactor concept for the efficient oxidation of sulfur tetrafluoride. Indeed, $CoF_3$ fluorinates sulfur tetrafluoride in a gas-solid heterogenous reaction to produce sulfur hexafluoride. This process does not produce undesired side products like $S_2F_{10}$ or $SO_2$, but result in the desired sulfur hexafluoride. The simple reactor for this process avoids the cost of energy for the electrolytic method.

Cobalt trifluoride is a common fluorinating agent for commercial production of many perfluorinated organic compounds form saturated and unsaturated hydrocarbons. As shown in Equation 1, in those reactions cobalt trifluoride is reduced to difluoride:

$$CoF_3 + R\!-\!H \rightarrow CoF_2 + R\!-\!F + HF \qquad \text{Eqn. 1}$$

Passing a steady flow of elemental fluorine through a $CoF_3$ bed produces an efficient $CoF_2/CoF_3$ oxidation-reduction system. Therefore, a process for $CoF_3$ catalyzed fluorination of sulfur tetrafluoride; to produce sulfur hexafluoride is described in this patent.

SUMMARY OF THE INVENTION

Figure 1:
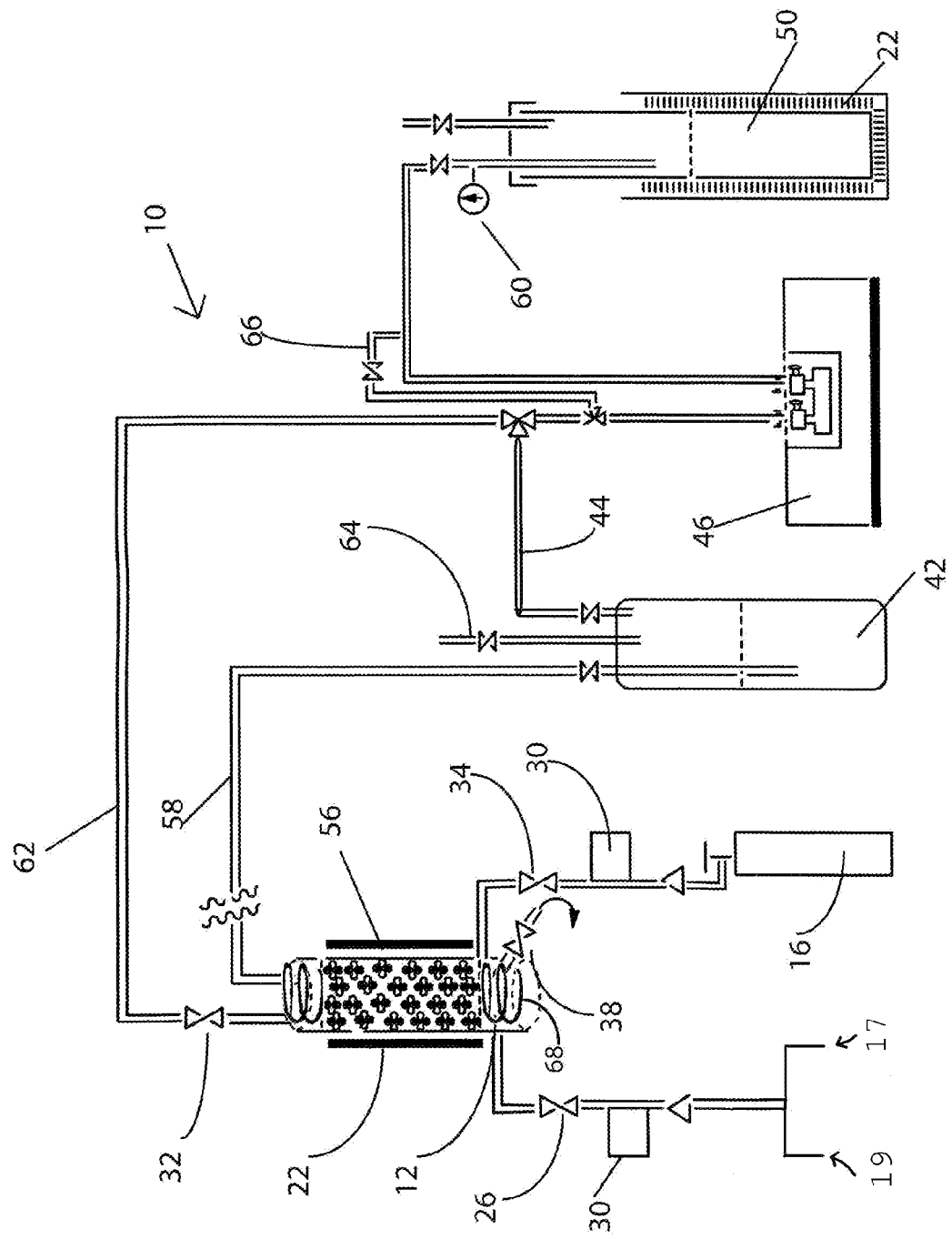
FIG. 1 is a view of the laboratory setup to perform the method, with the reactor in vertical mode.

The invention of this patent provides an energy-efficient improvement in the production of sulfur hexafluoride, and eliminates the generation of other byproducts. The process is an oxidative fluorination of sulfur tetrafluoride by $CoF_3/F_2$, where $CoF_3$ is solid stationary phase that can be regenerated. The overall process can be summarized as a combination of the following reactions in Equations 2-4:

$$SF_4 + F_2(g) \xrightarrow{CoF_3} SF_6(g) \qquad \text{Eqn. 2}$$

$$CoF_3 + SF_4(g) \rightarrow CoF_2 + SF_6(g) \qquad \text{Eqn. 3}$$

$$CoF_2 + F_2(g) \rightarrow CoF_3 \qquad \text{Eqn. 4}$$

Each of these independent reactions can proceed with varying degrees success at 25-450° C. However, 40-100% conversion of sulfur tetrafluoride to sulfur hexafluoride in continuous operation is achieved above 100° C., with flow regulation such that reagent-$CoF_3$ contact time is 1-10 minutes. The yield is also dependent on the gaseous reagent composition, which can be 1:1 to 1:1.5 $SF_4/F_2$.

The reactor can be made from a nickel or Teflon material, and must support the weight of the $CoF_3$ bed, as well as hold 20 PSIG pressure higher than the line pressure. The inlet reagent or sweep gases have to be at a minimum pressure that ensures flow through the reactor bed, generally at 1-50 PSIG. With a density of 3.88 Kg/L, the packing of the $CoF_3$ stationary bed is a significant factor in controlling the required pressure to drive the process flow through the reactor. The bed can be arranged as layered compartments, or filled around nickel or Teflon balls to engineer excellent diffusion of the reagents and/or process gases in a large scale reactor. To this end, the reactor can be placed in a vertical or a horizontal position (FIGS. 1 and 2), to ensure a process flow that is sufficient for the preferred time of 2-5 minutes.

In actual practice, there can be a consideration for the rate of reaction versus the cost of energy for a high temperature process to determine the minimum cost of production of sulfur hexafluoride by this approach. Suitable reactors can be arranged in a series in order to increase contact time at a lower temperature where the reaction rate does not produce high yields at the process conditions. The reactor may be designed to any suitable configuration, such as cylindrical, tubular, cubic, etc. However, the appropriate reactor should produce excellent diffusion of process gas for maximum contact with the $CoF_3$ stationary bed.

Process yield of the method is a function of temperature, contact time, diffusion, and pressure. However, diffusion and contact time are also functions of pressure and the ratio of flow (slpm)/mass (Kg) of $CoF_3$ bed. During scale up, longer contact time is required for flow process at higher than 10 PSIG pressure in order to achieve the efficiency of lower pressure processes.

Stirring and significant agitation is very useful for improvement of the rates of process reactions. Mechanical agitation can be achieved by introduction of an auger in the horizontal reactor orientation, or a stirrer in the vertical orientation. Mechanical agitation improves diffusion, and potential for large gas-solid contact that could exponentially improve the reaction rates at lower temperatures. In a large scale process, the yields will be determined as a function of rate of agitation, temperature, and pressure. The yields will be a function of diffusion and the reaction kinetics.

The dilution of elemental fluorine feedstock is an important determinant of the flow efficiency. However, while low flow of pure fluorine feedstock will increase contact efficiency, it has higher handling risks, and produce significant corrosion of nickel reactor material, as well as costly loss of unreacted fluorine molecules. A compromise is the design of the reactor around a 20% $F_2/N_2$ mixture. A compromise is the design of the reactor around a 20% $F_2/N_2$ mixture, with 20% pure fluorine and 80% pure nitrogen.

The purity of the $SF_4$ feedstock is also an important consideration. High quality $SF_4$ reagent will produce high quality $SF_6$, with minimum byproducts that require further purification. Typical gas phase impurities of $SF_4$ include thionyl fluoride ($SOF_2$), sulfur monofluoride ($S_2F_2$), and sulfur difluoride ($SF_2$) and hydrogen fluoride (HF). It is necessary to ensure that sample delivery lines to the reactor are moisture free. Otherwise, the process will contain significant amounts of HF, which may generate a different type of reaction in the system. Total impurity content of less than 10,000 ppm (or 1%) has little to no effect on $SF_6$ production in a continuous flow process. Further, sulfur compounds in S(2+) and S(4+) oxidation states are reactive and get scrubbed when the process flow is channeled through a post-reactor alkaline scrubber.

The process flow stream includes $N_2$, $SF_6$, $F_2$, and $SF_4$. An online 5-L alkaline scrubber (1-5 M solution of potassium hydroxide) removed reactive $F_2$ (2-3% excess), and $SF_4$ from the flow stream; followed by a trap kept at −78° C. to remove $SF_6$. The untrapped $N_2$ from the process is vented after trap 3. This approach has produced crude $SF_6$ product with purity at 99.9%. Further cryogenic purification of this product has produced 99.995+% commercial quality. The total impurity content, including oxygen ($O_2$), water ($H_2O$), nitrogen ($N_2$), total hydrocarbon content, carbon tetrafluoride ($CF_4$), and hydrogen fluoride (HF) is less than 50 ppm.

DESCRIPTION OF THE PREFERRED EMBODIMENTS

Figure 3:
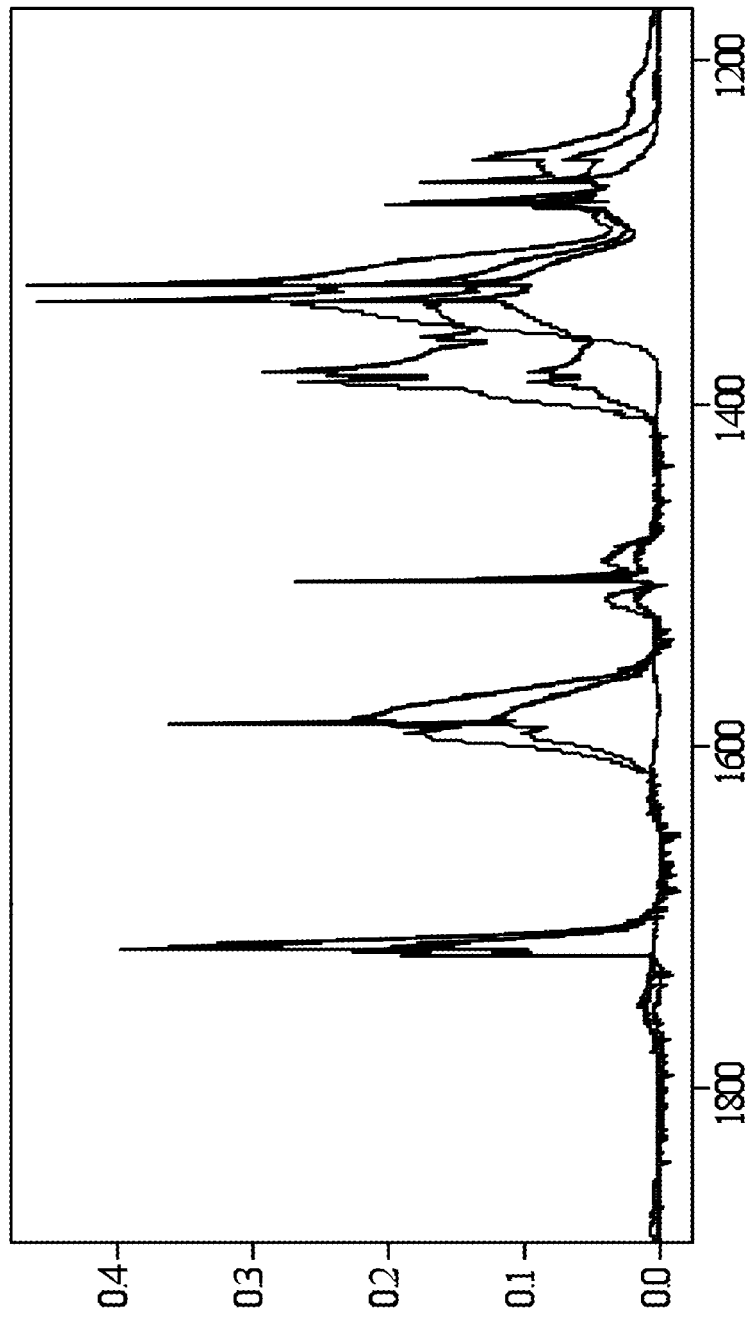
FIG. 3 is an overlay of three FTIR scans from online monitoring the production of $SF_6$ from $SF_4$.

Fluorination of sulfur tetrafluoride with elemental fluorine in the presence of $CoF_3$ proceeds under external-kinetic control since the $CoF_3$ concentration in the surface layer is constant owing to timely or even advance supply of fluorine (Eqn. 4). The method of fluorination of $SF_4$ is designated 10 in the figures and is shown in FIG. 1 in a vertical reactor column 12 made from nickel, with an internal diameter (i. d.)=1½", height=16". The reactor was packed with $CoF_3$ with a bed height of 12", for a space volume of 21 $in^3$ or 348 cc. A hinged three-heater Lindberg Blue furnace 56 with thermostat controller was used to ensure that temperature variation throughout the bed did not exceed ±4° C. throughout the process. Independent flows to ensure stoichiometric reagents, i.e. $SF_4$ and $F_2$, as well as the sweep gas (where necessary), i.e. $N_2$, argon, or helium, were allowed to mix in the reactor, just before the introduction to the $CoF_3$ bed. The mixture was supplied at constant rates to the process. The experiments were performed at 100, 150, 200, and 250° C.; to determine the temperature dependent $SF_6$:$SF_4$ yield in the effluent for total flow of 210 sccm (standard cubic centimeter). The yields are shown in Table 3, and an overlay of selected FTIR absorbance spectra of the process effluent at different temperatures is shown in FIG. 3.

Figure 2:
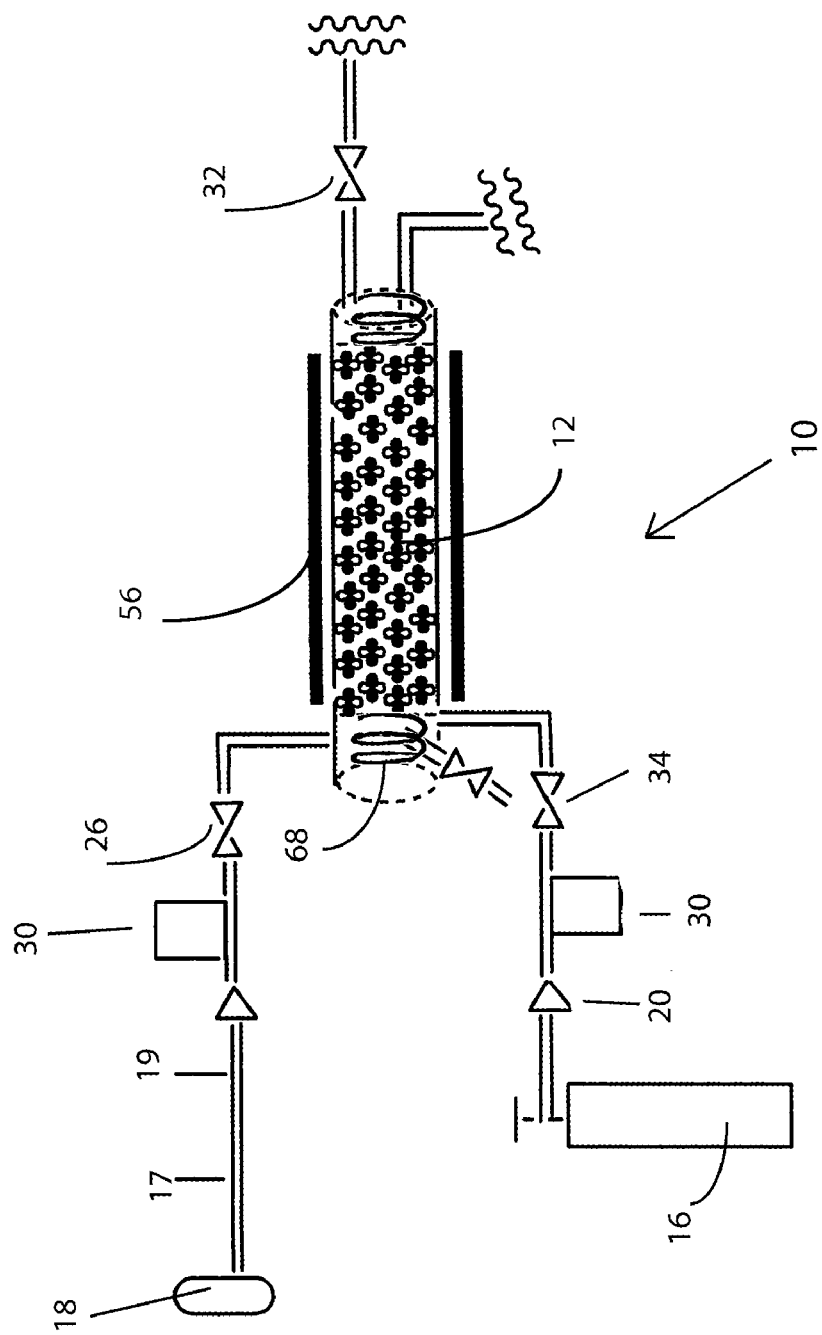
FIG. 2 is a view of the laboratory setup to perform the method, with the reactor in horizontal mode.

Shown in FIG. 1 is a laboratory scale version of the process 10 of the invention. Shown is a nickel reaction vessel 12 which can be oriented vertically as shown in FIG. 1, or which can be oriented horizontally as shown in FIG. 2. The reactor can be made from a nickel or Teflon material, and must support a weight of the $CoF_3$ bed and hold 20 PSIG of pressure. The inlet pressure is 1-50 PSIG, which is sufficient to ensure flow through the reactor bed. The reactor bed has a density of 3.88 kilograms per liter, with the packing of the solid $CoF_3$ in a stationary bed a significant factor of controlling the required pressure to drive the process flow through the reactor. The bed can be arranged as layered compartments, or filled around nickel or Teflon balls to engineer excellent diffusion of the reagents and/or process gasses in a large scale reactor. Show in FIG. 1 is a source 19 of $SF_4$, and a source 16 of 20% $F_2N_2$. Also present is a source 17 of $N_2$. The $N_2$ source 17 and the $SF_4$ 19 are on one line feeding the reaction vessel 12 and pass through a mass flow controller 30 and a first valve 26. The transfer lines through which these two feed streams flow would typically be made of fluorine passivated stainless steel, with Nickel, or Monel, with Teflon also being suitable to 200 degree centigrade.

The other feed material is 20% $F_2N_2$ from a tank 16. This gas is 20% $F_2$ and 80% pure nitrogen. This gas flows through a pressure regulator 20, through a mass flow controller 30, through a valve 34 and into the reaction vessel 12. The reaction vessel 12 is surrounded by a thermostat controlled heater 56, which keeps the reaction in an optimal temperature range, which is typically 25-450 degrees centigrade, in which range 100% conversion of sulfur tetrafluoride to sulfur hexafluoride is achieved above 100 degrees centigrade. The flow is regulated so that the contact time with the $CoF_3$ reagent is 1-10 minutes. In the laboratory scale version, the reaction vessel 12 is approximately 3 inches in diameter, 18 inches in height, and is packed with approximately 1 Kg grams of $CoF_3$, which serves as a stationary catalyst. The lines for conducting 20% $F_2N_2$ from tank 16 into the reaction vessel 12 are typically made of fluorine passivated stainless steel, with Nickel, Monel, or Teflon, and in the laboratory scale version are approximately ¼ inches in diameter.

An agitator of some kind, such as auger 68, helps to improve the reaction in the reaction vessel 12. A valve 38 is shown in the figures and may be used to relieve pressure in the reaction vessel.

From the reaction vessel 12 a steady flow of $SF_6$ gas is routed to a KOH scrubber 42 designated trap 1, via line 58. Another line, designated 62, exits the reaction vessel 12, and may be used as a bypass of trap 42 and may route $SF_6$ directly to an analytical instrument 46 by opening valve 32. Lines 62 and 58 in the laboratory scale version can be made of fluorine passivated stainless steel, with Nickel, Monel, or Teflon, with an ID of ¼ being suitable. In the laboratory scale version of the invention the KOH scrubber 42 is approximately 18 inches in diameter and 24 inches tall and holds approximately 5 L of 1-5 molar KOH. A vent line 64 exits the trap 42, and allows venting of the trap 42 if need be, such as to a vacuum.

The KOH in the trap 42 absorbs unreacted fluorine and sulfur tetrafluoride, and the purified $SF_6$ product passes from the scrubber 42 through an inline dryer 44. From the online dryer 44 the $SF_6$ gas is routed to analytical instrumentation 46, which preferably is FTIR. From the FTIR device $SF_6$ gas passes into a trap 2, designated 50, which is kept at −78 degrees centigrade by a cryogenic cooling unit 22. Trap 2 is designated 50 and serves as $SF_6$ storage. From trap 2 purified $SF_6$ may be removed for further purification to vent or storage. Associated with trap 50 is a pressure gauge 60. A bypass line 66 is available to bypass the analytical instrumentation 46.

The trap 2 designated 50 in the laboratory scale version is approximately 2 inches in diameter, 18 inches tall, and is made of fluorine passivated stainless steel. Other materials could also be used such as Nickel, Monel, or Teflon.

FIG. 2 shows the same laboratory set up with the reaction vessel 12 oriented vertically.

FIG. 3 shows an overlay of three Fourier transform infrared (FTIR) spectrometer scans from online monitoring of the production of $SF_6$ from $SF_4$, using the method described above at different temperatures. These curves compare pure $SF_4$ diluted in $N_2$ with the gases produced in the method, with the ratio of $SF_6$ to $SF_4$ being optimized at higher temperatures.

TABLE 1

Enthalpies (ΔH's) of the oxidation of $SF_4$ to produce $SF_6$

| Temperature (° C.) | $O_2$ | $F_2$ | $XeF_4$ | $CoF_3$ |
|---|---|---|---|---|
| 100 | −107.516 | −109.441 | −169.747 | −166.552 |
| 150 | −107.693 | −109.487 | −169.953 | −166.167 |
| 200 | −107.818 | −109.503 | −170.107 | −165.758 |
| 250 | −107.901 | −109.493 | −170.217 | −165.332 |
| 300 | −107.947 | −109.463 | −170.290 | −164.896 |
| 350 | −107.960 | −109.415 | −170.333 | −164.453 |
| 400 | −107.947 | −109.354 | −170.349 | −164.005 |
| 450 | −107.915 | −109.282 | −170.346 | −163.553 |

TABLE 2

Log K of the equilibrium constants for reagents that react with $SF_4$ to produce $SF_6$

| Temperature (° C.) | $O_2$ | $F_2$ | $XeF_4$ | $CoF_3$ |
|---|---|---|---|---|
| 100 | 48.970 | 53.159 | 90.565 | 73.715 |
| 150 | 41.522 | 45.583 | 78.809 | 62.200 |
| 200 | 35.640 | 39.606 | 69.528 | 53.141 |
| 250 | 30.878 | 34.772 | 62.015 | 45.832 |
| 300 | 26.945 | 30.782 | 55.810 | 39.813 |
| 350 | 23.641 | 27.433 | 50.599 | 34.774 |
| 400 | 20.829 | 24.583 | 46.161 | 30.496 |
| 450 | 18.406 | 22.129 | 42.337 | 26.819 |

TABLE 3

Temperature dependent $SF_6$:$SF_4$ yield for total flow of 210 sccm at 20 PSIG

| Process condition | FTIR Yield ($SF_6$:$SF_4$) at 10 minutes into process | | | |
|---|---|---|---|---|
| Temperature | 100° C. | 150° C. | 200° C. | 250° C. |
| Flow* @ 30 sccm $SF_4$, 30 sccm $F_2$, and 150 sccm $N_2$ | 40:60 | 60:40 | 70:30 | 90:10 |

*Total flow = 210 sccm. This implies that the contact time of $SF_4$/$F_2$ with $CoF_3$ is 1 min 40 sec.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

What is claimed is:

1. A method for producing sulfur hexafluoride by oxidative fluorination, comprising the steps of:
   providing a reaction vessel for containment of a catalyst;
   placing a selected quantity of cobalt trifluoride ($CoF_3$) as the catalyst in said reaction vessel;
   maintaining a temperature in said reaction vessel at 25-450° C.;
   attaching said reaction vessel to a source for each of $N_2$, $SF_4$ and $F_2$/$N_2$ by transfer lines;
   feeding a first stream of $F_2$/$N_2$ and a second stream containing a mixture of $N_2$+$SF_4$ into said reaction vessel by transfer lines;
   passing said first and second streams through said reaction vessel under a pressure of 1-50 PSIG to produce a flow of $SF_6$ gas; and
   passing said flow of $SF_6$ gas to a collection vessel kept at approximately −78° C. or cooler.

2. The method of producing sulfur hexafluoride of claim 1, which further comprises the step of passing said flow of $SF_6$ gas from said reaction vessel through an alkaline scrubber for stripping of contaminants from $SF_6$ gas before said collection vessel.

3. The method of producing sulfur hexafluoride of claim 2, wherein a solution of KOH is used in said alkali scrubber.

4. The method of producing sulfur hexafluoride of claim 1, which further comprises the step of using an agitator in the reaction vessel.

5. The method of producing sulfur hexafluoride of claim 4, in which said agitator comprises an auger in a horizontally oriented reaction vessel.

6. The method of producing sulfur hexafluoride of claim 4, in which said agitator comprises a stirrer in a vertically oriented reaction vessel.

7. The method of producing sulfur hexafluoride of claim 1, in which said catalyst is packed in said reaction vessel to a density of at least 3 Kg/L.

8. The method of producing sulfur hexafluoride of claim 7, in which said catalyst is packed in said reaction vessel to a density of approximately 3.9 Kg/L.

9. The method of producing sulfur hexafluoride of claim 1, wherein a thermostatically controlled heater is used to maintain the temperature in said reaction vessel.

10. The method of producing sulfur hexafluoride of claim 1, which further comprises the step of passing $SF_6$ gas through an analytical instrumentation device before said collection vessel.

11. The method of producing sulfur hexafluoride of claim 10 which further comprises the step of attaching a vacuum source to said transport transfer lines for flushing gas from said lines.

12. The method of producing sulfur hexafluoride of claim 1 which further comprises the step of providing a mass flow controller (MFC) in at least one of the transfer lines.

13. The method of producing sulfur hexafluoride of claim 12 in which said MFC is provided at least in the transfer line for $SiF_4$.

14. The method of producing sulfur hexafluoride of claim 12 in which said MFC is provided at least in the transfer line for $F_2/N_2$.

15. A method for producing sulfur hexafluoride by oxidative fluorination, comprising the steps of:
providing a reaction vessel for containment of a catalyst;
placing a selected quantity of cobalt trifluoride ($CoF_3$) as the catalyst in said reaction vessel;
maintaining a temperature in said reaction vessel above 100° C.;
attaching said reaction vessel to a source for each of $N_2$, $SF_4$ and $F_2/N_2$;
feeding a first stream of $F_2/N_2$ and a second stream containing a mixture of $N_2+SF_4$ into said reaction vessel;
passing said first and second streams through said reaction vessel under a pressure of greater than 10 PSIG to produce a flow of $SF_6$ gas; and
passing said flow of $SF_6$ gas to a collection vessel kept at approximately −76° C. or cooler.

16. A method for producing sulfur hexafluoride by oxidative fluorination, comprising the steps of:
providing a reaction vessel for containment of a catalyst;
placing a selected quantity of $CoF_3$ as said catalyst, packed in said reaction vessel to a density of at least 3 Kg/L;
maintaining a temperature in said reaction vessel above 100° C.;
attaching said reaction vessel to a source for each of $N_2$, $SF_4$ and $F_2/N_2$;
using an agitator in said reaction vessel;
feeding a first stream of $F_2/N_2$ and a second stream containing a mixture of $N_2+SF_4$ into said reaction vessel;
passing said first and second streams through said reaction vessel under a pressure of greater than 10 PSIG to form a flow of $SF_6$ gas;
passing said effluent $SF_6$ gas from said reaction vessel through an alkaline scrubber for stripping of contaminants from $SF_6$ gas; and
passing said flow of $SF_6$ gas to a collection vessel kept at approximately −76° C. or cooler.

* * * * *

UNITED STATES PATENT AND TRADEMARK OFFICE
CERTIFICATE OF CORRECTION

| | | |
|---|---|---|
| PATENT NO. | : 8,231,855 B2 | Page 1 of 1 |
| APPLICATION NO. | : 12/980111 | |
| DATED | : July 31, 2012 | |
| INVENTOR(S) | : Bamidele A. Omotowa | |

It is certified that error appears in the above-identified patent and that said Letters Patent is hereby corrected as shown below:

In the Specification

Column 1, Lines 3-5

Please insert the following paragraph under the paragraph heading, --Statement Regarding Federally Sponsored Research or Development--:

--This invention was made with Government support under NSF Award No. 1127186 (Title: "NIFUT Technology for recycling fluorides from Uranium Tetrafluoride") awarded by the National Science Foundation. The Government has certain rights in this invention. 45 CFR 650.4(f)(4).--

Signed and Sealed this
Fourteenth Day of October, 2014

Michelle K. Lee
*Deputy Director of the United States Patent and Trademark Office*